(12) United States Patent
Walter et al.

(10) Patent No.: US 11,137,306 B2
(45) Date of Patent: Oct. 5, 2021

(54) METHOD FOR MONITORING THE OPERATION OF A PRESSURE MEASURING CELL OF A CAPACITIVE PRESSURE SENSOR

(71) Applicant: IFM ELECTRONIC GMBH, Essen (DE)

(72) Inventors: Heinz Walter, Hergatz (DE); Manfred Maurus, Bad Waldsee (DE)

(73) Assignee: IFM ELECTRONIC GMBH, Essen (DE)

( * ) Notice: Subject to any disclaimer, the term of this patent is extended or adjusted under 35 U.S.C. 154(b) by 0 days.

(21) Appl. No.: 17/258,120

(22) PCT Filed: Jul. 29, 2019

(86) PCT No.: PCT/EP2019/070317
§ 371 (c)(1),
(2) Date: Jan. 5, 2021

(87) PCT Pub. No.: WO2020/025519
PCT Pub. Date: Feb. 6, 2020

(65) Prior Publication Data
US 2021/0199529 A1    Jul. 1, 2021

(30) Foreign Application Priority Data
Aug. 1, 2018 (DE) .................. 10 2018 118 645.2

(51) Int. Cl.
*G01L 9/00* (2006.01)
*G01L 9/12* (2006.01)
*G01L 27/00* (2006.01)

(52) U.S. Cl.
CPC .............. *G01L 9/0072* (2013.01); *G01L 9/12* (2013.01); *G01L 27/007* (2013.01)

(58) Field of Classification Search
CPC ........ G01L 9/0072; G01L 9/12; G01L 27/007
See application file for complete search history.

(56) References Cited

U.S. PATENT DOCUMENTS 5,969,258 A * 10/1999 Gerst ..................... G01L 9/125
361/283.4
2006/0152380 A1    7/2006 Anderson et al.
(Continued)

FOREIGN PATENT DOCUMENTS

CN    105829850 A    8/2016
DE    19851506 C1    10/2000
(Continued)

*Primary Examiner* — Herbert K Roberts
*Assistant Examiner* — John M Royston
(74) *Attorney, Agent, or Firm* — Harness, Dickey & Pierce, P.L.C.

(57) ABSTRACT

The disclosure relates to a method for monitoring the operation of a pressure measuring cell of a capacitive pressure sensor, wherein the pressure measuring cell comprises a pressure-dependent measuring capacitor and a pressure-dependent reference capacitor and the pressure measuring value is obtained as a measuring signal from the capacitance values of the measuring capacitor and the reference capacitor, wherein the measuring signal is supplied to an evaluation unit in the form of an alternating square-wave signal, the pulse height of the signal depending on quotients of the capacitance values of the reference capacitor and the measuring capacitor and the period of the signal being determined by the capacitance value of the measuring capacitor such that, in the nominal pressure range of the pressure sensor, there is a fixed correlation between the pulse height and the period, wherein the pairs of values of pulse height and period (h1, d1), . . . , (hn, dn) are stored as nominal values in an adjustment procedure for determined pressure values p1, . . . , pn, and wherein, for the currently measured pressure value px, with the pair of actual values (Continued)

Figure 1:
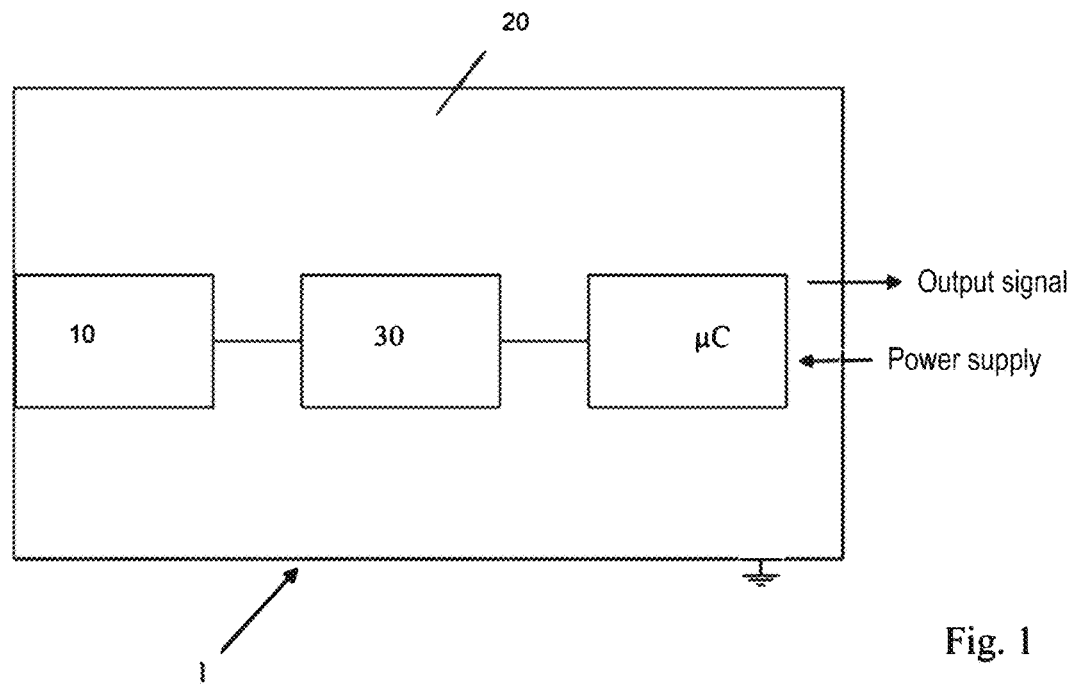

($h_{x\text{-}IST}$, $d_{x\text{-}IST}$), the pair of nominal values ($h_{x\text{-}SOLL}$, $d_{x\text{-}SOLL}$) is determined, and if there is significant deviation between the pair of actual values and the pair of nominal values, an error signal is generated.

5 Claims, 3 Drawing Sheets

(56) References Cited

U.S. PATENT DOCUMENTS

| | | | |
|---|---|---|---|
| 2013/0269412 | A1 | 10/2013 | Walter |
| 2014/0144206 | A1 | 5/2014 | Uehlin et al. |
| 2016/0341623 | A1 | 11/2016 | Paulitsch et al. |
| 2017/0023429 | A1* | 1/2017 | Straeussnigg ......... H03L 7/0891 |

FOREIGN PATENT DOCUMENTS

| | | |
|---|---|---|
| DE | 102010062622 A1 | 6/2012 |
| DE | 102011083133 A1 | 3/2013 |
| DE | 102014201529 A1 | 7/2015 |
| EP | 0569573 B1 | 4/1996 |
| EP | 2606330 B1 | 9/2014 |

\* cited by examiner

METHOD FOR MONITORING THE OPERATION OF A PRESSURE MEASURING CELL OF A CAPACITIVE PRESSURE SENSOR

CROSS-REFERENCE TO RELATED APPLICATIONS

This application is a U.S. National Phase Application under 35 U.S.C. 371 of International Application No. PCT/EP2019/070317 filed on Jul. 29, 2019, which claims the benefit of German Patent Application No. 10 2018 118 645.2, filed on Aug. 1, 2018. The entire disclosures of the above applications are incorporated herein by reference.

FIELD

The disclosure relates to a method for monitoring the operation of a pressure measuring cell of a capacitive pressure sensor.

BACKGROUND

This section provides background information related to the present disclosure which is not necessarily prior art.

Capacitive pressure sensors or pressure measuring devices are used in many industrial areas for pressure measurement. They often have a ceramic pressure measuring cell as a transducer for the process pressure and evaluation electronics for signal processing.

Capacitive pressure measuring cells consist of a ceramic base body and a diaphragm, wherein a glass solder ring is arranged between the base body and the diaphragm. The resulting cavity between the base body and the diaphragm enables the longitudinal movement of the diaphragm as a result of the action of pressure. This cavity is therefore also referred to as a measuring chamber. On the bottom side of the diaphragm and on the opposite top side of the base body, respective electrodes are provided which together form a measuring capacitor. The action of pressure causes the diaphragm to deform, which results in a change in capacitance of the measuring capacitor.

By use of an evaluation unit the change in capacity is detected and converted into a pressure measuring value. Typically, these pressure sensors are used to monitor or control processes. They are therefore often connected to higher-level control units (PLC).

From DE 19851506 C1 a capacitive pressure sensor is known in which the pressure measuring value is determined from the quotient of two capacitance values of a measuring capacitor and a reference capacitor. Although a pressure measuring cell is not specifically described in this patent specification, the circuit illustrated and the method described are suited for capacitive pressure measuring cells. The special feature of this pressure measuring device is that for evaluating the measurement signal at the output as a measure for the detected pressure measuring value only the amplitude of the square-wave signal is relevant, regardless of its frequency.

From EP 0 569 573 B1 a circuit arrangement for a capacitive pressure sensor is known, in which a quotient method is used for pressure evaluation, too.

Quotient methods usually assume the following pressure dependencies:

$$p \sim \frac{C_R}{C_M} \text{ or } p \sim \frac{C_R}{C_M} - 1 \text{ or } p \sim \frac{C_M - C_R}{C_M + C_R}$$

wherein $C_M$ is the capacitance of the measuring capacitor, $C_R$ is the capacitance of the reference capacitor and p denotes the process pressure to be determined. It is also conceivable to interchange $C_M$ and $C_R$ in the quotient. The example given with $C_M$ in the denominator in favor of the intrinsic linearization, however, is the most common form. Thus, in the following this embodiment is assumed, unless stated otherwise.

The reliability with the use of capacitive pressure sensors is becoming more and more important. Problematic with capacitive pressure sensors that operate according to the quotient method is that a medium entry—caused by a diaphragm rupture or enabled by a possible venting channel—could not yet be recognized due to the quotient formation, because the dielectric constant $\varepsilon_r$ changes accordingly both in the numerator and in the denominator. This problem is made worse if $\varepsilon_r$ of the entering medium differs only slightly from $\varepsilon_r$ of air. This is in particular the case when the medium to be measured is oil. $\varepsilon_r$ of oil is typically between 2 and 4, while $\varepsilon_r$ of air is 1.

For this purpose, EP 2 606 330 B1 suggests to determine with the use of an additional capacitor, the capacity of which is independent of the diaphragm pressure, a control pressure measuring value, which is compared with the actual pressure measuring value.

As a further state of the art with regard to the monitoring of the operation of capacitive pressure sensors the following documents are mentioned: DE 10 2011 083133 A1, DE 10 2010 062622 A1, US 2014/0144206 A1, US 2006/0152380 A1, DE 10 2014 201529 A1.

SUMMARY

This section provides a general summary of the disclosure, and is not a comprehensive disclosure of its full scope or all of its features.

The object of the disclosure is to propose an alternative and cost-efficient method for monitoring the operation of a pressure measuring cell of a capacitive pressure sensor.

Basic idea of the disclosure is the recognition that in the nominal pressure range of the pressure sensor there is a fixed relationship between pulse height or amplitude and the period duration or frequency, and that when a medium enters the measuring chamber—caused by a diaphragm rupture or by entry via the venting channel—the square-wave signal formed from the quotient of the measuring capacitance $C_M$ and the reference capacitance $C_R$ shown above is significantly changed. In addition, due to the construction of the pressure measuring cell there is also a fixed relationship in the pressure-dependent course of the two capacitance values of $C_M$ and $C_R$, so that an incipient crack or a rupture of the diaphragm, which influences the deformation behavior of the diaphragm, can be detected.

A medium—even if only in small quantities—entering the measuring chamber, due to the inevitable increase of $\varepsilon_r$, leads to an increase in capacity, depending on which electrodes and thus which dielectric are affected.

If only the external reference electrode is influenced, for example because the venting channel is typically arranged very close to the reference electrode, the pulse height becomes significantly smaller at the same period duration. The same situation arises if a diaphragm rupture has occurred in the outer area and thus $C_R$ is deformed more easily than $C_M$.

In the rather unlikely event that only the measuring electrode is affected or an incipient crack or a rupture of the diaphragm has occurred in the central area, the exact opposite situation arises, namely that the pulse height becomes significantly greater at the same period duration.

In the more likely case, if the medium is evenly distributed in the measuring chamber and thus on the reference and measuring electrodes due to a diaphragm rupture or entry via the venting channel, the capacities of $C_M$ and $C_R$ increase to the same extent. As stated above, in this case the pulse height remains unchanged. What is new, however, is the finding that in this case the period duration changes significantly so that it is now possible to monitor the reliability of the pressure sensor by evaluating the frequency or period duration of the square-wave signal, which are otherwise irrelevant for the determination of the current pressure value.

The method according to the disclosure thus relates to an evaluation of the pulse height and period duration with respect to the actually measured pressure. For this purpose, in a calibration procedure either for specific pressure values $p_1, \ldots, p_n$ the pairs of values of pulse height and period duration $(h_1, d_1), \ldots, (h_n, d_n)$ have been stored as target values or the functional dependency between pulse height and period duration in the form of a polynomial. In the first case, for the currently measured pressure value $p_x$ with the pair of actual values $(h_{x\text{-}IST}, d_{x\text{-}IST})$ the pair of target values $(h_{x\text{-}SOLL}, d_{x\text{-}SOLL})$ is determined, wherein in the case of a significant deviation between the pair of actual values and the pair of target values an error signal is generated. In the second case, the stored polynomial describes the functional relationship between pulse height $h_x$ and period duration $d_x$, so that for a measured pressure value $p_x$ with the pulse height $h_{x\text{-}IST}$ by use of the polynomial the associated value for the period duration $d_{x\text{-}SOLL}$ can be determined. If the period duration $d_{x\text{-}Soll}$ determined from the polynomial does not match with the actual, measured period duration $d_{x\text{-}IST}$, an error is signaled.

It is thus possible to carry out a monitoring of the operation of the pressure measuring cell of a capacitive pressure sensor by means of an appropriate signal evaluation with the use of the existing evaluation circuit and thus without any additional components and to detect capacitive error influences quickly and early.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The disclosure is explained below in detail based on exemplary embodiments with reference to the drawings.

Figure 2:
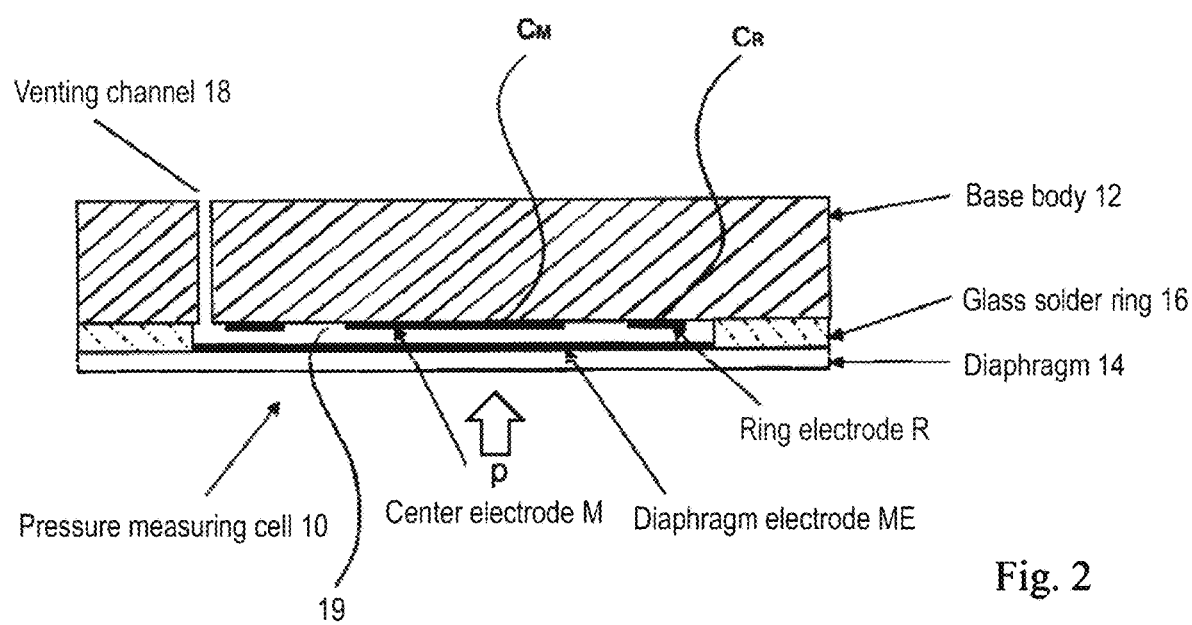
Figure 3:
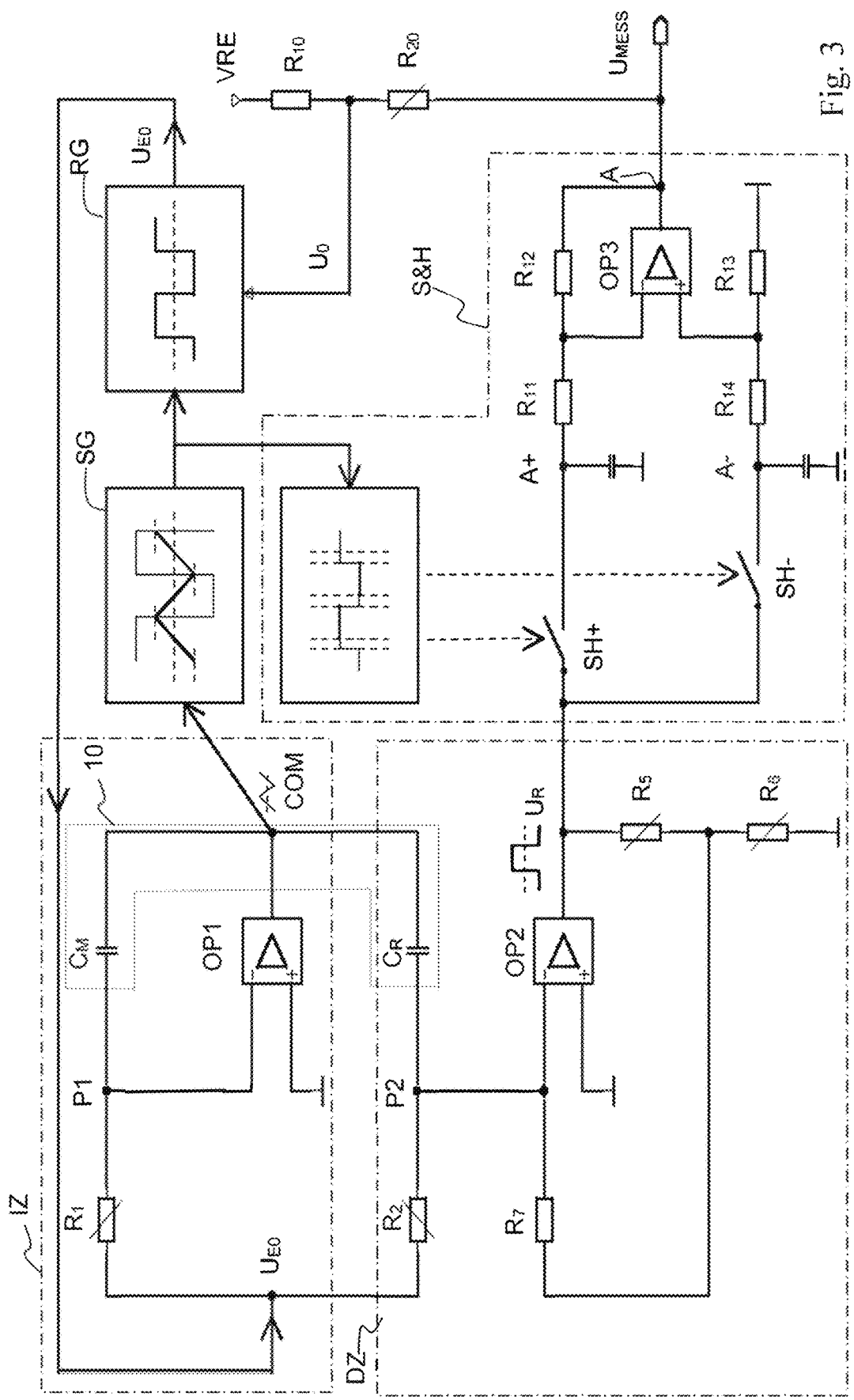
Figure 4:
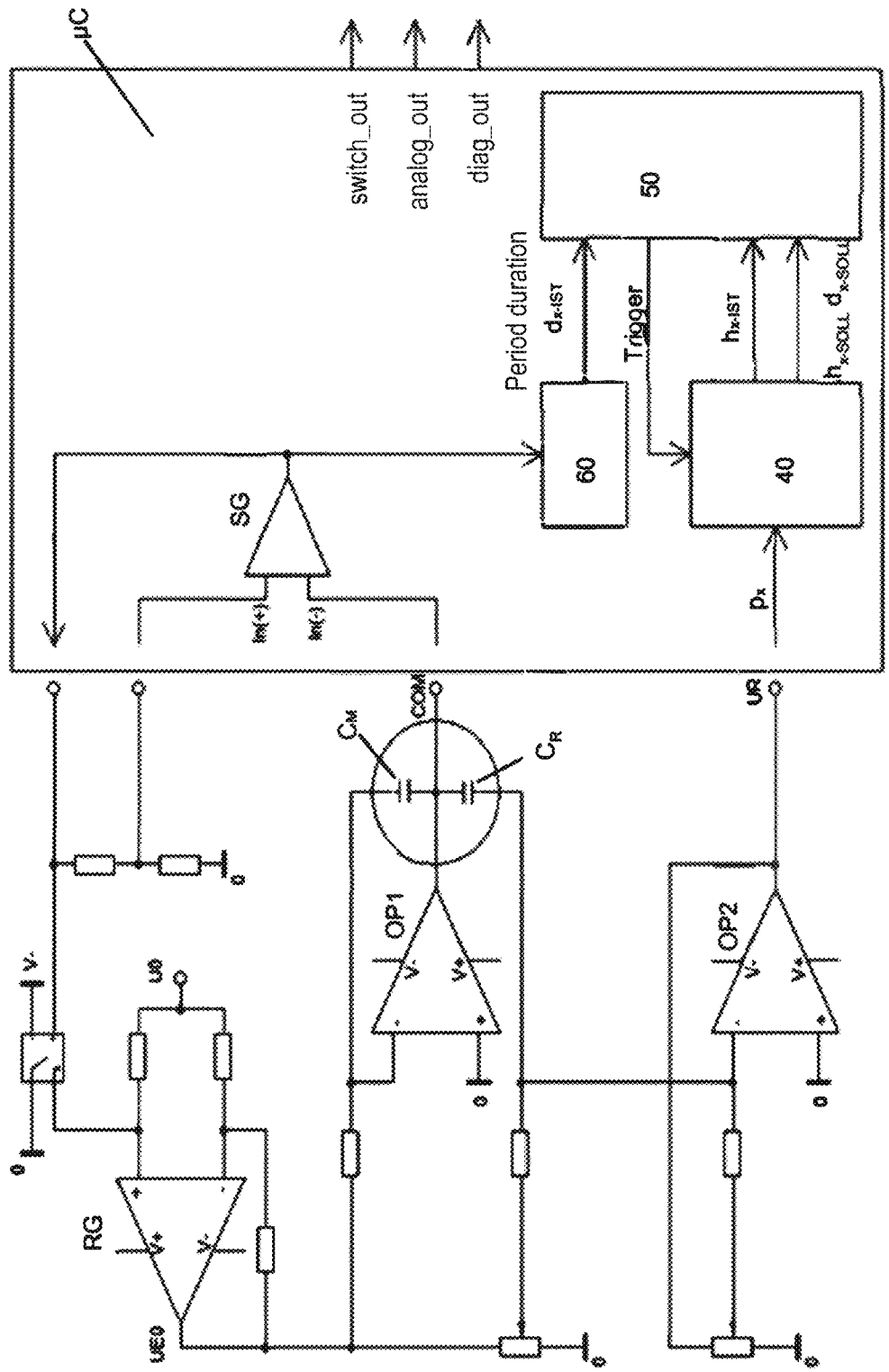

The drawings schematically show:

FIG. 1 a block diagram of a capacitive pressure measuring device;

FIG. 2 a schematic sectional view of a capacitive pressure measuring cell;

FIG. 3 a known evaluation circuit for a capacitive pressure measuring cell according to FIG. 2; and FIG. 4 the evaluation circuit of FIG. 3, supplemented by a microcontroller for carrying out the method according to the disclosure.

In the following description of the preferred embodiments, the same reference symbols designate the same or comparable components.

DETAILED DESCRIPTION

Example embodiments will now be described more fully with reference to the accompanying drawings.

FIG. 1 shows a block diagram of a typical capacitive pressure measuring device which is used to measure a process pressure p (for example of oil, milk, water, etc.). The pressure measuring device 1 is designed as a two-wire device and essentially consists of a pressure measuring cell 10 and evaluation electronics 20. The evaluation electronics 20 comprises an analog evaluation circuit 30 and a microcontroller µC in which the analog output signal of the evaluation circuit 20 is digitized and further processed. The microcontroller µC provides the evaluation result e.g. to a PLC as a digital or analog output signal. The pressure measuring device 1 is connected to a voltage supply line (12-36 V) for energy supply.

FIG. 2 shows a schematic representation of a typical capacitive pressure measuring cell 10 as it is used in a variety of capacitive pressure measuring devices. The pressure measuring cell 10 consists essentially of a base body 12 and a diaphragm 14, which are connected to one another via a glass solder ring 16. The base body 12 and the diaphragm 14 delimit a cavity 19, which—preferably only at low pressure ranges up to 50 bar—is connected to the rear side of the pressure measuring cell 10 via a venting channel 18.

Both on the base body 12 and on the diaphragm 14 a plurality of electrodes are provided which form a reference capacitor $C_R$ and a measuring capacitor $C_M$. The measuring capacitor $C_M$ is formed by the diaphragm electrode ME and the center electrode M, the reference capacitor $C_R$ is formed by the ring electrode R and the diaphragm electrode ME.

The process pressure p acts on the diaphragm 14, which bends more or less according to the applied pressure, wherein essentially the distance between the diaphragm electrode ME and the center electrode M changes. This leads to a corresponding change in the capacitance of the measuring capacitor $C_M$. The influence on the reference capacitor $C_R$ is less because the distance between the ring electrode R and the diaphragm electrode ME changes less than the distance between the diaphragm electrode ME and the center electrode M.

In the following, it is not differentiated between the designation of the capacitor and its capacity value. $C_M$ and $C_R$ therefore designate both the measuring or reference capacitor per se, as well as its capacitance.

A known evaluation circuit 30 for the pressure measuring cell 10 is shown in more detail in FIG. 3. The measuring capacitor $C_M$ is arranged together with a resistor $R_1$ in an integrating branch IZ and the reference capacitor $C_R$ is arranged together with a resistor $R_2$ in a differentiating branch DZ. A square-wave voltage $U_{E0}$ which preferably alternates symmetrically around 0 volts is applied at the input of the integrating branch IZ. The input voltage $U_{E0}$ is converted via the resistor $R_1$ and the measuring capacitor $C_M$ with the use of an operational amplifier OP1, which works as an integrator, into a linearly increasing or decreasing voltage signal (depending on the polarity of the input voltage) that is output at the output COM of the integrating branch IZ. Here, the measuring point P1 is virtually at ground due to the operational amplifier OP1.

The output COM is connected to a threshold value comparator SG which drives a square-wave generator RG.

As soon as the voltage signal at the output COM exceeds or falls below a threshold value, the comparator SG changes its output signal, whereupon the square-wave generator RG respectively inverts its output voltage.

The differentiating branch DZ moreover consists of an operational amplifier OP2, a voltage divider with the two resistors $R_5$ and $R_6$ and a feedback resistor $R_7$. The output of the operational amplifier OP2 is connected to a sample and hold circuit S&H. At the output of the sample and hold circuit S&H the measurement voltage $U_{Mess}$ is provided, from which the process pressure p is obtained which acts on the pressure measuring cell 10.

Hereinafter, the function of this measuring circuit is explained in more detail. The operational amplifier OP1 ensures that the connection point P1 between the resistor $R_1$ and the measuring capacitor $C_M$ is kept virtually at ground. As a result, a constant current $I_1$ flows through the resistor $R_1$, which charges the measuring capacitor $C_M$ until the square-wave voltage $U_{E0}$ changes its sign.

It can be seen from FIG. 3 that for the case $R_1=R_2$ and $C_M=C_R$ the measuring point P2 in the differentiating branch DZ is even then at the same potential as the measuring point P1, i.e. at ground level, if the connection between the measuring point P2 and the operational amplifier OP2 would not exist. This applies not only in this special case, but whenever the time constants $R_1*C_M$ and $R_2*C_R$ are equal to each other. During the zero point calibration, this state is set accordingly via the variable resistors $R_1$ and $R_2$, respectively. If the capacitance of the measuring capacitor $C_M$ changes due to the action of pressure, the condition of the equality of the time constants in the integrating branch IZ and in the differentiating branch DZ is no longer given and the potential at the measuring point P2 would deviate from the value zero. However, this change is immediately counteracted by the operational amplifier OP2 because the operational amplifier OP2 continues to hold the connection point P2 virtually at ground. At the output of the operational amplifier OP2 therefore a square-wave voltage UR is provided, the amplitude of which depends on the quotient of the two time constants. It can easily be shown that the amplitude is directly proportional to the process pressure $p\sim C_R/C_M-1$, wherein the dependence is essentially linear. The amplitude can be adjusted via the voltage divider, which is formed by the two resistors $R_5$ and $R_6$.

The positive and negative amplitudes A+ and A− of the square-wave signal are added in terms of amount via a sample and hold circuit S&H, wherein the amount A is output as measurement voltage $U_{Mess}$ at the output of the operational amplifier OP3 and forwarded to the microcontroller μC (not shown). However, it could also be output directly as an analog value. The amplitude of the input voltage $U_{E0}$, which is present at the output of the square-wave generator RG, is set dependent on the measurement voltage $U_{Mess}$ in order to achieve better linearity. To this end, a voltage divider consisting of resistors $R_{20}$ and $R_{10}$ is provided. This voltage divider is connected to a reference voltage VREF and can advantageously be adjusted.

The positive operating voltage V+ is typically at +2.5 V and the negative operating voltage V− at −2.5 V.

FIG. 4 shows in principle the evaluation circuit known from FIG. 3, which, however, is supplemented by a microcontroller μC. In this microcontroller μC on the one hand, the comparator-oscillator SG from FIG. 3 is integrated and, on the other hand, it comprises the units necessary for carrying out the method according to the disclosure: a timer 60, a memory 40 and a CPU 50 as a processing unit. The elements disposed outside of the microcontroller μC are essentially identical and therefore also denoted identically. In order to avoid repetitions, in the following, only the elements essential to the disclosure will be discussed.

On the one hand, the output signal of the threshold value comparator SG is fed back in order to drive the square-wave generator RG, which is already known from FIG. 3. On the other hand, this signal is fed to the timer 60. In the timer 60 the time period behavior of the triangular signal is recorded, in particular with regard to the reaching of the set threshold values. The period duration which is fed to the CPU 50 is derived therefrom. In the present case, the period duration of this triangular signal is identical to that of the actual measurement signal UR, so that the detection of the period duration is particularly advantageous in this way.

Furthermore, the microcontroller μC comprises a memory 40, which is initially supplied with the currently measured pressure value $p_x$ in the form of the voltage signal UR known from FIG. 3. At the same time, and not shown in detail for reasons of illustration, the pressure value $p_x$ is also sent to the output switch_out or analog_out of the microcontroller μC in order to output the measured pressure values as a switching or analog signal. The sample and hold circuit S&H known from FIG. 3 as part of the evaluation circuit shown there is then also integrated into the microcontroller μC and simulated there functionally identical.

Moreover, a trigger signal, which the CPU 50 generates from the period duration, is also fed to the memory 40. This trigger signal precisely defines the point in time at which the actual value of the pulse height $h_{x-IST}$ of the voltage signal UR is to be stored. This point in time is advantageously exactly in the middle of a positive square-wave pulse in terms of time.

In a calibration procedure that took place before the application of the pressure sensor, for specified pressure values $p_1, \ldots, p_n$ the value pairs of pulse height and period duration $(h_1, d_1), \ldots, (h_n, d_n)$ have been stored, too, as target values in the memory 40, in particular in a look-up table.

In the CPU 50, the pair of target values $h_{x-SOLL}$, $d_{x-SOLL}$ is determined for the currently measured pressure value $p_x$ with the pair of actual values $h_{x-IST}$, $d_{x-IST}$, and if there is a significant deviation between the pair of actual values and the pair of target values, an error signal is generated, which is output at the output diag_out.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for monitoring the operation of a pressure measuring cell of a capacitive pressure sensor,
    wherein the pressure measuring cell comprises a pressure-dependent measuring capacitor and a pressure-dependent reference capacitor and the pressure measurement value (p) is obtained as a measurement signal from the capacitance values of the measuring capacitor and the reference capacitor,
    wherein the measurement signal is fed to an evaluation unit in the form of an alternating square-wave signal, the pulse height of which depends on the quotient of the capacitance values of the reference capacitor and the measuring capacitor and the period duration of which is determined by the capacitance value of the measuring capacitor so that in the nominal pressure range of the pressure sensor there is a fixed relationship between pulse height and period duration, wherein in a calibration procedure for specific pressure values $p_1, \ldots, p_n$ the value pairs of pulse height and period duration $(h_1, d_1), \ldots, (h_n, d_n)$ have been stored as target values, wherein the pair of target values $(h_{x\text{-}SOLL}, d_{x\text{-}SOLL})$ is determined for the currently measured pressure value $p_x$ with the pair of actual values $(h_{x\text{-}IST}, d_{x\text{-}IST})$ and if there is a deviation between the pair of actual values $(h_{x\text{-}IST}, d_{x\text{-}IST})$ and the pair of target values $(h_{x\text{-}SOLL}, d_{x\text{-}SOLL})$ an error signal is generated.

2. The method according to claim 1, wherein the storage of the target values and the comparison with the actual values takes place in a microcontroller.

3. The method according to claim 2,
wherein the microcontroller comprises a timer, a memory and a processing unit, characterized by the following method steps:
the timer determines the period duration of the alternating square-wave signal and outputs this as a value $d_{x\text{-}IST}$ and forwards it to the processing unit;
the currently measured pressure value $p_x$ in the form of the alternating square-wave signal and a trigger signal which the processing unit has generated from the period duration $d_{x\text{-}IST}$ and which precisely defines at which point in time the actual value of the pulse height $h_{x\text{-}IST}$ of the alternating square-wave signal is to be stored, are fed to the memory;
the processing unit determines the pair of target values $h_{x\text{-}SOLL}, d_{x\text{-}SOLL}$ for the currently measured pressure value $p_x$ with the pair of actual values $h_{x\text{-}IST}, d_{x\text{-}IST}$ and compares these two value pairs with one another.

4. The method according to claim 3, wherein the pairs of target values $(h_{x\text{-}SOLL}, d_{x\text{-}SOLL})$ are stored in a lookup table.

5. A method for monitoring the operation of a pressure measuring cell of a capacitive pressure sensor,
wherein the pressure measuring cell comprises a pressure-dependent measuring capacitor and a pressure-dependent reference capacitor and the pressure measurement value (p) is obtained as a measurement signal from the capacitance values of the measuring capacitor and the reference capacitor,
wherein the measurement signal is fed to an evaluation unit in the form of an alternating square-wave signal, the pulse height of which depends on the quotient of the capacitance values of the reference capacitor and the measuring capacitor and the period duration of which is determined by the capacitance value of the measuring capacitor so that in the nominal pressure range of the pressure sensor there is a fixed relationship between pulse height and period duration,
wherein the pressure sensor comprises a microcontroller with a timer, a memory and a processing unit,
characterized by the following method steps:
defining and storing the functional relationship between the pulse height $h_x$ and the period duration $d_x$ in the form of a polynomial in the memory;
the timer determines the period duration $d_x$ of the alternating square-wave signal and forwards it as the value $d_{x\text{-}IST}$ to the processing unit;
determining the period duration $d_{x\text{-}SOLL}$ associated with a measured pressure value $p_x$ with the pulse height $h_{x\text{-}IST}$ based on the polynomial;
comparing the value for the period duration $d_{x\text{-}SOLL}$ determined based on the polynomial with the actual, measured period duration $d_{x\text{-}IST}$ and generating an error signal in the case of a deviation between $d_{x\text{-}IST}$ and $d_{x\text{-}SOLL}$.

* * * * *